Dec. 10, 1940.   J. L. MERRILL   2,224,483
ELECTRIC TOASTER
Filed July 31, 1934   2 Sheets-Sheet 1
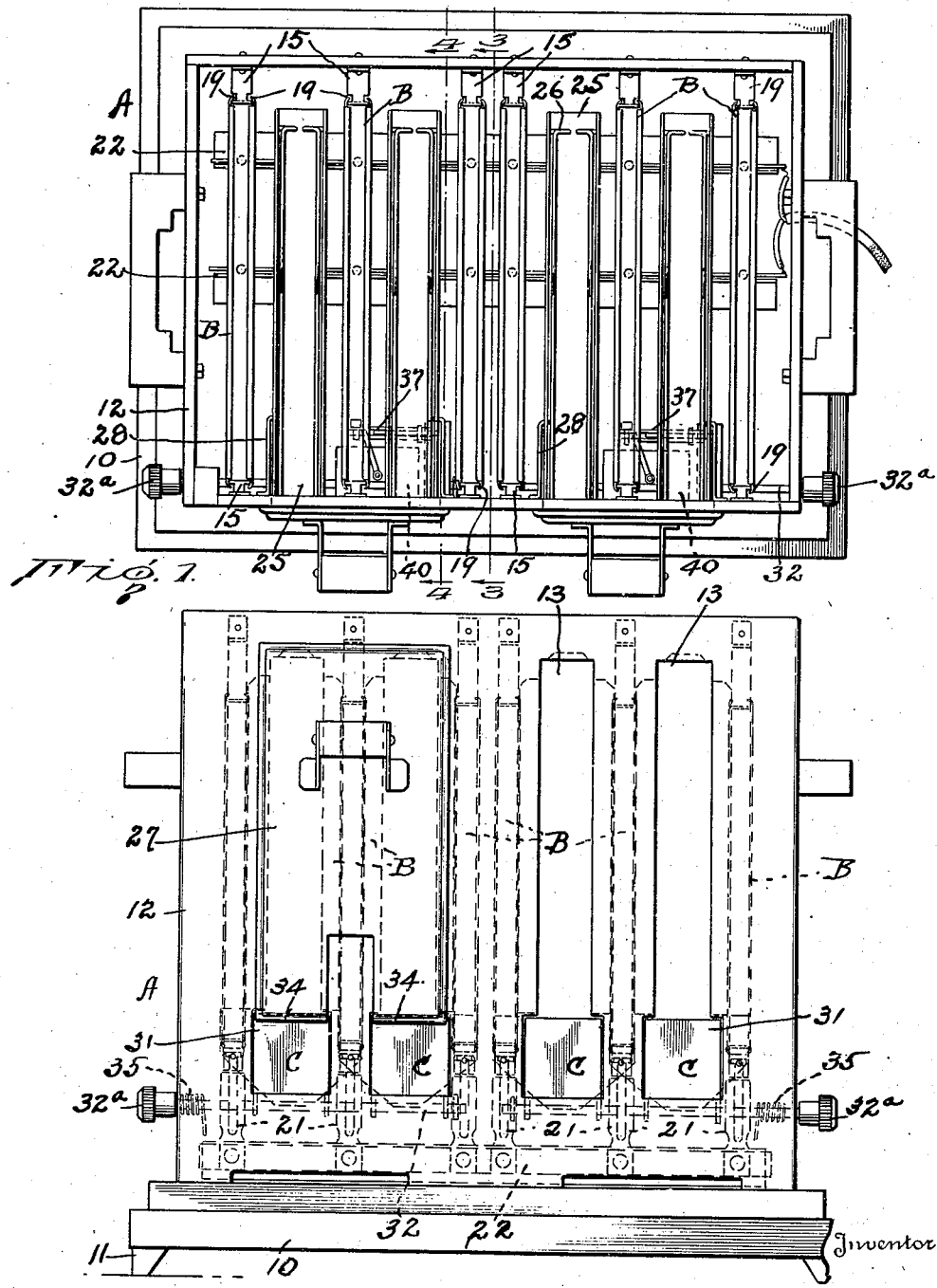

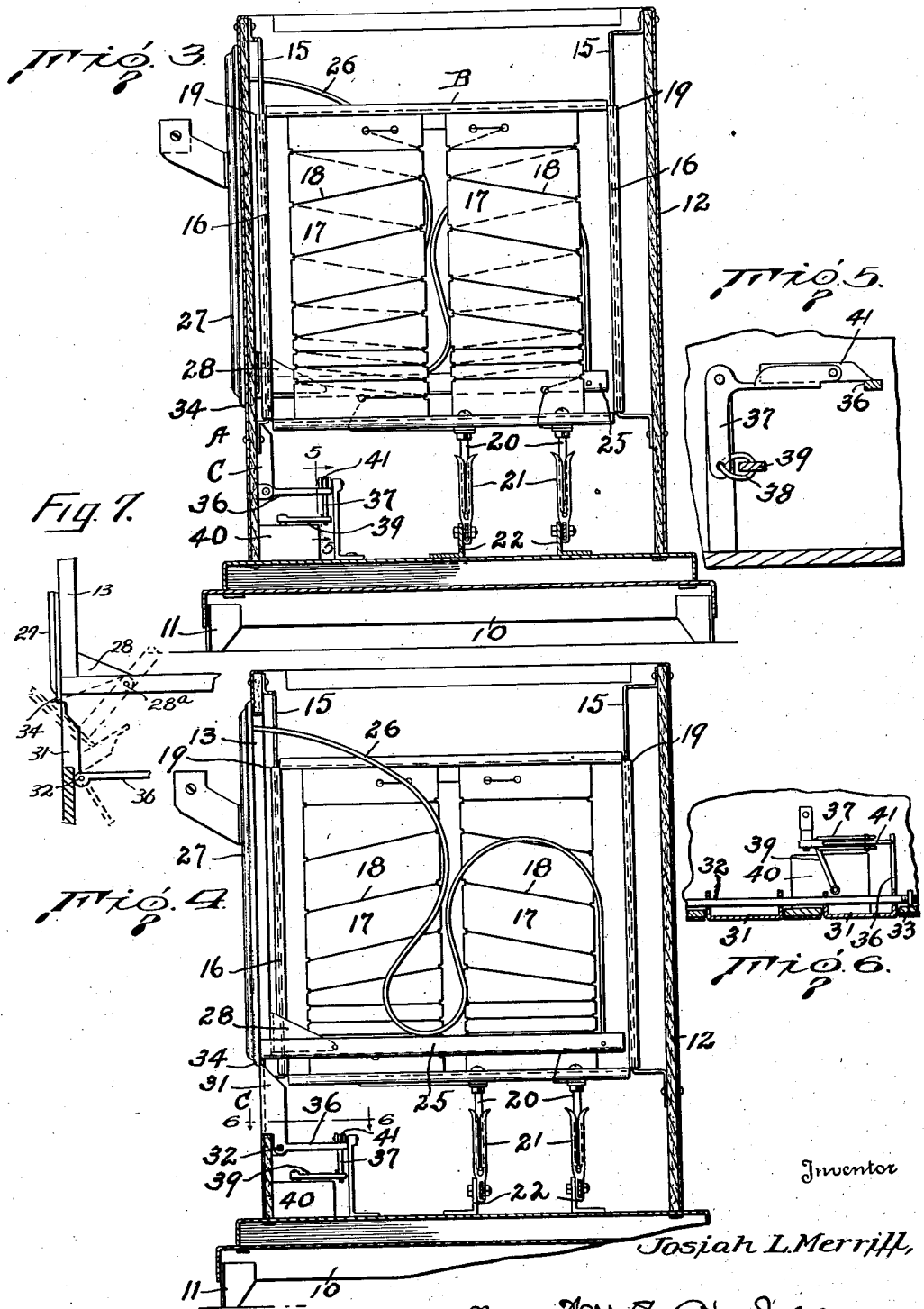

Patented Dec. 10, 1940

2,224,483

UNITED STATES PATENT OFFICE 2,224,483

ELECTRIC TOASTER

Josiah L. Merrill, Elmhurst, Long Island, N. Y.

Application July 31, 1934, Serial No. 737,806

8 Claims. (Cl. 219—19)

This invention is an electrically heated device for toasting slices of bread, and other similar articles of food.

One of the objects of the invention is to provide an electric toaster equipped with independent unitary toasting devices, so constructed and arranged that each device may be readily removed from the supporting structure, for replacement or repair. A further object is to provide an electric toaster in which the heater units are retained in position by fixed guides, with which the units have removable slidable engagement. A further object is to provide means for independently connecting each heater unit with a source of electrical energy, in such manner that the respective units may be readily removed without in any manner interfering with the operative functions of the other units.

The invention will be hereinafter fully set forth and particularly pointed out in the claims.

In the accompanying drawings:

Figure 1 is a top plan view illustrating an electric toaster constructed in accordance with the invention. Figure 2 is a front elevation. Figure 3 is a vertical sectional view on the line 3—3, Figure 1. Figure 4 is a similar sectional view on the line 4—4, Figure 1. Figure 5 is a detail sectional view of the thermostatic release mechanism on the line 5—5, Figure 4. Figure 6 is a detail sectional view on the line 6—6, Figure 4, illustrating the mounting of the retainer members. Figure 7 is a detail view illustrating one of the hinge supports.

Referring to the drawings, A designates the supporting structure comprising a base 10, resting upon suitable feet or supports 11, and sustaining a vertically disposed casing 12, preferably of approximately rectangular form in plan view, said casing having a normally unobstructed open top portion bound by the vertical walls thereof. The front wall of said casing is provided with relatively spaced vertically disposed, elongated openings 13. Located within said casing are suitable heater guide members, each consisting of a strip 15, the strips being arranged in pairs. One guide strip of each pair is directly secured to the inner face of the front wall of the casing, and the other guide strip 15 of the pair is similarly secured to the inner face of the rear wall of the casing, the two strips being in diametric alignment with each other. The ends of the guide strips are secured to the supporting structure in any desired manner, and the body portions of said strips are offset, as shown, so that they are spaced from the adjacent supporting surfaces.

The heater units B each consist of a supporting frame 16, carrying one or more flat cores 17, of dielectric material, such as mica, upon which are wound resistances 18, of any desired or well-known form. Each frame is slidably and removably engaged with a pair of aligned guide strips 15, in any desired maner, so that the respective heaters may be readily removed from the casing, as units. For purposes of illustration and without intention to limit, the stiles of the frames 16 are provided with inturned flanges 19, which embrace the strips 15 in such manner that the frames are free to slide along the guide strips, the arrangement being such that at all times the heater units may be readily removed from the casing through the unobstructed open top thereof.

The terminals of the resistances 18 of each heater unit are electrically connected with the contact plugs 20, carried by the bottom portions of the frames 16, said plugs being complemental to sockets 21, mounted on insulated bus-bars 22, located in the bottom of the casing 12. The bus-bars 22 are placed at the back of the frame 12, so as not to interfere with the necessary controlling mechanism at the front, and to also make it necessary to always position the plugs of the units B to the rear while replacing the units after removal for inspection or repair. It is to be understood that any desired number of heater units may be employed, but for purposes of illustration six of such units are shown, arranged in two groups of three each, and so spaced that bread or the like carried by four bread racks interposed between them may be simultaneously toasted on both sides.

The material to be toasted, such as slices of bread, is carried by trays 25 equipped with wire-retaining racks 26, said trays being carried by and extending inwardly from doors 27 which are pivotally supported by hinges 28 in such manner that each door portion will extend over and close an opening 13 while the door and tray unit are in toasting positions. The doors and trays are preferably constructed as units, each unit consisting of a door member and a tray member, each member having one end secured to an end of the other, so as to be disposed in angular relation, and pivotally supported by hinges 28 at positions spaced rearwardly from the front wall of the casing. For the purposes of better illustration, one of the door and tray units has been omitted in Figure 2.

Each door is provided with a handle 29 and preferably with two carrier trays 25 arranged in parallel relation. The hinges 28 are fixedly secured at their front ends to the inner face of the front wall of the toasting chamber, and are extended rearwardly into the chamber in approximately the same plane as the plane of the trays while in toasting position within the chamber. Each hinge 28 is provided at its rear end with a pivot 28a which engages one side of a tray 25 at a position well within the toasting chamber. As shown, there is one hinge 28 engaging each tray 25, so that each door unit consisting of the door and two trays connected therewith is pivotally connected with the main frame by means of two hinges (see Figure 1). The pivots 28a are so placed with respect to the center of gravity of the door unit that even with slices of bread on the trays, the weight on the door side of the pivot is so much greater than the weight on the other side of the pivot that, as viewed in Figures 2 and 3, the door will naturally gravitate to the left, unless restrained by the retainer member C, about to be described (see Figure 7).

Each door and tray unit is normally held closed by retainer members C, each consisting of a flap 31 secured to a squared shaft 32, rotatively mounted in suitable bearings 33, in a plane to support said flaps in positions opposite to or below the lower ends of the openings 13, and in such manner that the upper edge of each flap fits behind a flange 34 on the lower edge of a door 27. Said retainer members are normally held against the inner surfaces of the flanges 34 with a yieldable outward pressure, by means of springs 35 engaged with the shaft 32. Obviously, rotation of the shaft 32 by manual manipulation of the knobs 32a, against the tension of said springs will move the retainer members in a direction to disengage them from the doors, so that the latter may open by gravity.

If it is desired to operate the retainer members automatically, one of said members is provided with an arm 36 forming an approximate bell-crank arrangement. Pivoted to the casing in suitable manner is a bell-crank lever 37, one arm of which is connected to an arm 39 of a thermostatic switch by means of a link 38, said switch being conventionally shown at 40. A pawl 41 is pivoted to the other arm of the bell-crank lever 37, and bears against it in such manner that it will move the arm 36 while the bell-crank lever is being rocked in one direction, but will tilt so as to pass said arm while the bell-crank lever is returning to its original position. The shaft 32 is so arranged that the automatic operation of the retainer members does not in any way interfere with the manual manipulations of the shaft.

In operation, when it is desired to charge the toaster, the retainer members C are moved manually to disengaged position, so that the doors 27 will drop to a lowered position by gravity, bringing the supports 25 to vertical positions at the front of the casing 12. After the racks have been loaded, the doors may be closed manually, whereupon the retainer members will automatically move to closed position. Upon completion of the toasting functions, the retainer members may be moved back by rotation of shaft 32, against the tension of its springs, thereby releasing the doors and allowing them to open by gravity, so that the toasted material may be readily removed. At the same time the retainer members C are forced into horizontal positions and held there until the doors are again raised. Should any one of the heater units become inoperative for any reason, it may be slid to the top of the frame 12, and the flanges 19a disengaged from the complemental guides 15 by continued upward movement through the top of the casing. The removed unit may then be readily replaced by a new unit, or while it is being repaired, the toasting functions of the other units are in no way impaired, and the toaster may be continued in use pending replacement of the removed unit.

The advantages of the invention will be readily understood by those skilled in the art to which it belongs. For instance, it will be seen that the toasters are constructed as independent units which may be readily removed for inspection, repair, or replacement, as occasion may require. An important advantage is that the toasting units are so connected with the source of electrical energy that the removal of any one of them will in no way disable or impair the operative functions and efficiency of the remaining units, pending replacement of the removed units.

Having thus explained the nature of the invention and described an operative manner of constructing and using the same, although without attempting to set forth all of the forms in which it may be made, or all of the forms of its use, what is claimed is:

1. An electric toaster comprising a main casing, one or more doors so pivoted to said casing that they are normally moved to open position by gravity, each door having a rack so positioned as to extend into said casing while the door is in closed position, each door having a bottom flange, spring pressed retainer members movably supported by the main frame and having their upper edges interposed between the front wall of said casing and the inner faces of said door flanges, and engaging said flanges in such manner as to normally hold the doors in closed position, rotatable shafts having means for moving said retainer members against their normal spring tension, and one or more slidably supported heater units so positioned as to be adjacent said racks while the doors are in closed position, each heater unit consisting of a supporting frame and a heater element constructed and arranged as a single unitary device independent of each of the other toasters.

2. An electric toaster comprising a main casing, one or more doors so pivoted to the casing that they will normally move to open position by gravity, each door having a toast-supporting rack so positioned as to extend into the casing while the door is in closed position, a spring-pressed rotatively mounted shaft, retainer members mounted on said shaft in such manner as to move therewith, said retainer members being so positioned as to prevent opening movement of the doors while the latter are in closed position, and temperature responsive means so connected with the shaft as to impart rotative movement thereto in opposition to the spring pressure in such manner as to move said retainer members to door releasing positions.

3. An electric toaster comprising a main casing, one or more doors so pivoted to the casing that they will normally move to open position by gravity, each door having a toast-supporting rack so positioned as to extend into the casing while the door is in closed position, a spring-pressed rotatively mounted shaft, retainer members mounted on said shaft in such manner as to move therewith, said retainer members being so positioned as to prevent opening movement of the doors while the latter are in closed position, an arm carried by one of said retainer members, a bell-crank lever engaging said arm, and temperature-responsive means so connected with said bell crank as to actuate the same, said bell-crank lever and said arm being so constructed and arranged as to impart rotative movement to said shaft in opposition to the spring pressure in such manner as to move said retainer members to door releasing position.

4. An electric toaster comprising an open top casing having openings in its front wall, one or more combined door and tray units, each consisting of a door member and a tray member each having one end secured to an end of the other, so as to be disposed in angular relation, means for pivotally connecting said units to the frame at positions spaced rearwardly from the front wall of said casing, so that each unit is normally urged outwardly through a front wall opening by gravity, means for releasably holding said units with the door members in vertical positions and the tray members in horizontal positions, so as to close said front wall openings, one or more heater units located within the casing at positions adjacent said tray members, said heater units being slidably mounted in the casing and removable therefrom through the open top thereof, and independent electrical connections for the respective heater units, said electrical connections being so constructed and arranged that they may be connected and disconnected by said slidable movement.

5. An electric toaster comprising a main casing provided with a toasting chamber, heater units located within said main casing, combined door and tray units each consisting of a door portion and a pair of laterally spaced, parallel tray portions, each rigidly connected at one end to the lower end of its door portion and disposed at an angle with respect to the latter, and so related that while in toasting position the tray portions are extended rearwardly into the toasting chamber and are disposed adjacent the lower portions of the heater units, hinge members secured to the front wall of said chamber and extended rearwardly into the latter in substantially the same plane as the plane occupied by the tray units while in toasting position, the rear ends of said hinge members being pivotally connected with sides of adjacent tray members at positions spaced rearwardly from the front wall and within the toasting chamber, and in such manner that the door portion is normally urged to horizontal position and the tray portions to vertical positions by the action of gravity, and means for normally retaining each door and tray unit with the tray portions in horizontal toasting positions.

6. An electric toaster comprising a main casing, one or more heater units located within said casing, each heater unit consisting of a supporting frame and a heater element constructed and arranged as a single unitary device independent of each of the other heater units, guide means directly secured to the inner surfaces of oppositely disposed walls of said casing and having means for engaging the heater units in such manner as to removably retain them in place, one or more combined door and tray units each consisting of angularly disposed door and tray portions, means pivotally connecting each tray portion to the casing at positions spaced rearwardly from the front wall thereof, and in a plane approximately the same as the plane of the tray portions while in toasting position, the door and tray portions being so relatively disposed that while in toasting position the door portion extends upwardly and the tray portion extends inwardly, the pivotal connection being so positioned that the door unit is normally urged to open position by the action of gravity, and means for normally holding the door and tray units in operative toasting position.

7. An electric toaster comprising a main casing provided with a toasting chamber, heating units located within said main casing, hinge members secured to and extended rearwardly from the front wall of and into said toasting chamber, one or more combined door and tray units each consisting of a door portion and a pair of laterally spaced, parallel tray portions each rigidly connected at one end to the lower end of its door portion and disposed at an angle with respect to the latter, and so related that while in toasting position the tray portions are extended rearwardly into the toasting chamber and disposed adjacent the lower portions of heater units, the rear portions of each hinge member being pivotally connected with the side of a tray member at positions spaced rearwardly from said front wall and within the toasting chamber, and in such manner that the door portion is normally urged to horizontal position and the tray portions to vertical positions by the action of gravity, spring pressed retainer members pivoted to said main frame and so positioned as to releasably engage said door portions and prevent opening movement of the combined door and tray units while the latter are in toasting position, and means for moving said retainer members to inoperative positions.

8. An electric toaster including a casing, heating means within said casing, a combined door and tray unit consisting of a door portion and a pair of laterally spaced parallel tray portions, each of the latter being rigidly connected at one end to the lower end of the door portion and disposed at an approximate right angle with respect to the latter and so related that while in toasting position the tray portions will lie in an approximately horizontal plane adjacent the heating means, hinge members secured to the front wall of the casing and extending rearwardly from said front wall into the casing in approximately the same plane as that occupied by said trays while in toasting position, means pivotally connecting the rear ends of the hinge members with the tray members at positions along the latter spaced rearwardly from the front wall of the casing, and means for releasably retaining said combined door and tray unit with said tray members in said positions adjacent said heating means.

JOSIAH L. MERRILL.